(12) United States Patent
Grzyb

(10) Patent No.: US 12,734,918 B2
(45) Date of Patent: Sep. 15, 2026

(54) TRANSFORMER AND ELECTRIC VEHICLE CHARGER COMBINATION

(71) Applicant: Class 1 Zone 1 Engineering Inc., Edmonton (CA)

(72) Inventor: Duane Grzyb, Edmonton (CA)

(73) Assignee: Class 1 Zone 1 Engineering Inc., Edmonton (CA)

( * ) Notice: Subject to any disclaimer, the term of this patent is extended or adjusted under 35 U.S.C. 154(b) by 892 days.

(21) Appl. No.: 17/960,400

(22) Filed: Oct. 5, 2022

(65) Prior Publication Data

US 2023/0113404 A1 Apr. 13, 2023

(30) Foreign Application Priority Data

Oct. 12, 2021 (CA) ..................................... 3133914

(51) Int. Cl.
*B60L 53/30* (2019.01)
*B60L 53/18* (2019.01)
*H02J 7/02* (2016.01)
*H02J 105/37* (2026.01)

(52) U.S. Cl.
CPC ............... *B60L 53/30* (2019.02); *B60L 53/18* (2019.02); *H02J 7/02* (2013.01); *H02J 2105/37* (2026.01); *H02J 2207/20* (2020.01)

(58) Field of Classification Search
CPC ........ B60L 53/305; B60L 53/53; B60L 53/30; B60L 53/18; H02J 7/02; H02J 7/00; H02J 2310/48; H02J 2207/20
USPC ................................................. 320/107, 109
See application file for complete search history.

(56) References Cited

U.S. PATENT DOCUMENTS

| | | | | |
|---|---|---|---|---|
| 7,868,588 B2 * | 1/2011 | Altekruse | .......... | H05K 7/20918 320/109 |
| 11,631,982 B2 * | 4/2023 | Robinson | ............... | B60L 53/57 320/107 |
| 2004/0201937 A1 * | 10/2004 | Yoshida | ................. | H02M 1/32 361/93.7 |
| 2007/0024255 A1 * | 2/2007 | Yasumura | .......... | H02M 3/3385 363/16 |
| 2009/0021213 A1 * | 1/2009 | Johnson | ................. | H02J 7/731 320/109 |
| 2011/0145141 A1 * | 6/2011 | Blain | ..................... | B60L 53/65 235/382 |

(Continued)

FOREIGN PATENT DOCUMENTS

| | | |
|---|---|---|
| CA | 3076689 A1 | 4/2019 |
| CN | 102682958 A * | 9/2012 |

(Continued)

*Primary Examiner* — Rexford N Barnie
(74) *Attorney, Agent, or Firm* — Secant IP, P.L.L.C.

(57) ABSTRACT

A transformer and electric vehicle charger combination has a charging box with a first hollow interior and a transformer box with a second hollow interior. A DC charger is positioned within the first hollow interior and a transformer is positioned within the second hollow interior. The DC charger is electrically connected to the transformer such that electricity from the transformer is supplied to the DC charger. At least one charging cord has a first end and a second end. The first end is in electrical communication with the DC charger. The second end of the charging cord has an electric connector for plugging into an electric vehicle charging port.

15 Claims, 7 Drawing Sheets

(56) References Cited

U.S. PATENT DOCUMENTS

2013/0069588 A1* 3/2013 Oda ........................ B60L 53/11
320/109
2014/0266017 A1* 9/2014 Hamada ................ H02M 7/003
320/107
2016/0193933 A1* 7/2016 Jiang ..................... B60L 53/305
320/109

FOREIGN PATENT DOCUMENTS

CN 103081247 A * 5/2013 .......... B60L 11/1816
CN 209921107 U * 1/2020

* cited by examiner 10
60
50
52
16
46
38
48
62
62
30
56
58
54
30
40
44
42
36
12
24

FIG. 7

TRANSFORMER AND ELECTRIC VEHICLE CHARGER COMBINATION

FIELD OF THE DISCLOSURE

The present application relates generally to a transformer and electric vehicle charger combination to allow for electric vehicle charging and the supply of electricity for other applications at the same time.

BACKGROUND

This section provides background information to facilitate a better understanding of the various aspects of the invention. It should be understood that the statements in this section of this document are to be read in this light, and not as admissions of prior art.

With the increased interest in the environment and climate change, there is renewed interest in the use of electric cars. Many car companies and governments have indicated that they intend to phase out the production of gas powered vehicles. As a result, it is expected that the number of electric powered cars will increase dramatically. The problem with this is that there is presently inadequate infrastructure to allow for charging of this increased number of cars. Having a charging station in every homeowner's garage with user's plugging their vehicles in at the same time for hours at a time or overnight is likely to overload the electrical service to neighborhoods and cause electrical issues for everyone on the same service. Presently, there is inadequate electrical transformation and inadequate electrical low voltage distribution capacity and wiring to support the anticipated increase in electric car charging loads. Other options for user's would be to drive to charging stations at various stations and garages. This is generally not feasible for many people due to the length of time required to fully charge a vehicle, as well as the distance of the charging station from their homes. Better methods of providing charging options to people with electric vehicles are needed.

BRIEF SUMMARY

There is provided a transformer and electric vehicle charger combination that has a charging box that has a first hollow interior and a transformer box having a second hollow interior. A DC charger is positioned within the first hollow interior. An electrical transformer is positioned within the second hollow interior. The DC charger is electrically connected to the transformer such that electricity from the transformer is supplied to the DC charger. At least one charging cord is provided. A first end of the charging cord is in electrical communication with the DC charger and the second end has an electric connector for plugging into an electric vehicle charging port.

In one embodiment, the charging box has at least one access door to provide access to the first hollow interior. This allows access for maintenance, cleaning, and inspection of the electric components within the enclosure.

In one embodiment, the transformer box has at least one access door to provide access to the second hollow interior. This allows access for maintenance, cleaning, and inspection of the electric components within the enclosure.

In one embodiment, a gasket is positioned between the charging box and the transformer box to provide sealing against moisture ingress between the charging box and the transformer box. This can help reduce damage, such as rusting, from decreasing the lifespan of both the charging box and the transformer box.

In one embodiment, a charging box door gasket is positioned on the at least one access door to provide sealing against moisture ingress into the first hollow interior between the at least one access door and the charging box.

In one embodiment, a transformer box door gasket is positioned on the at least one access door to provide sealing against moisture ingress into the second hollow interior between the at least one access door and the transformer box.

In one embodiment, a central computer is provided. The central computer controls the flow of electricity from the transformer to the DC charger and to the at least one charging cord.

In one embodiment, a payment authorization system is provided. The payment authorization system is connected to the central computer such that an authorized payment causes the central computer to allow a DC current to pass from the DC charger to the electric connector. The central computer prevents the DC current from passing from the DC charger to the electric connector when no authorized payment is made. The payment authorization system may include a credit card scanner, debit card scanner, or any other payment method known to a person skilled in the art. This may include the acceptance of cash.

In one embodiment a screen may also be included and positioned on the enclosure. The screen provides information about at least one of output readings, payment information, purchase options, charge status, estimated finishing time, or electricity rates.

In one embodiment, each of the at least one charging cords have a breakaway fitting to allow for breakaway of the charging cord at a predetermined force threshold.

In one embodiment, the breakaway of the charging cord at a predetermined force threshold causes shutdown of the flow of electricity from the DC charger.

In one embodiment, an emergency stop is provided in communication with the central computer such that activation of the emergency stop terminates the transfer of electricity from the DC charger to the at least one charging cord.

In one embodiment, the transformer has at least one dedicated output for the DC charger and at least one dedicated output for supplying electricity for an additional use. The at least one dedicated output for the DC charger and the at least one dedicated output for supplying electricity for an additional use have an overcurrent protection. Each of the at least one dedicated output for the DC charger and the at least one dedicated output for supplying electricity for an additional use are supplied by a single utility feeder connection.

In one embodiment, the charging box is positioned on a top of the transformer box. Stacking the charging box on top of the transformer box allows for the transformer and electric vehicle charger combination to be used in areas where a side by side orientation would take up too much room or could potentially require additional foundations, earthwork and wiring.

In one embodiment, the transformer box is positioned on a concrete pad mount. The concrete pad mounts are commonly used as bases for transformer boxes.

In one embodiment, the first hollow interior and the second hollow interior are integrally formed.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

FIG. 7 is a side elevation view of the transformer and electric vehicle charger combination having an integrated hollow interior.

DETAILED DESCRIPTION OF THE PREFERRED EMBODIMENTS

Figure 1:
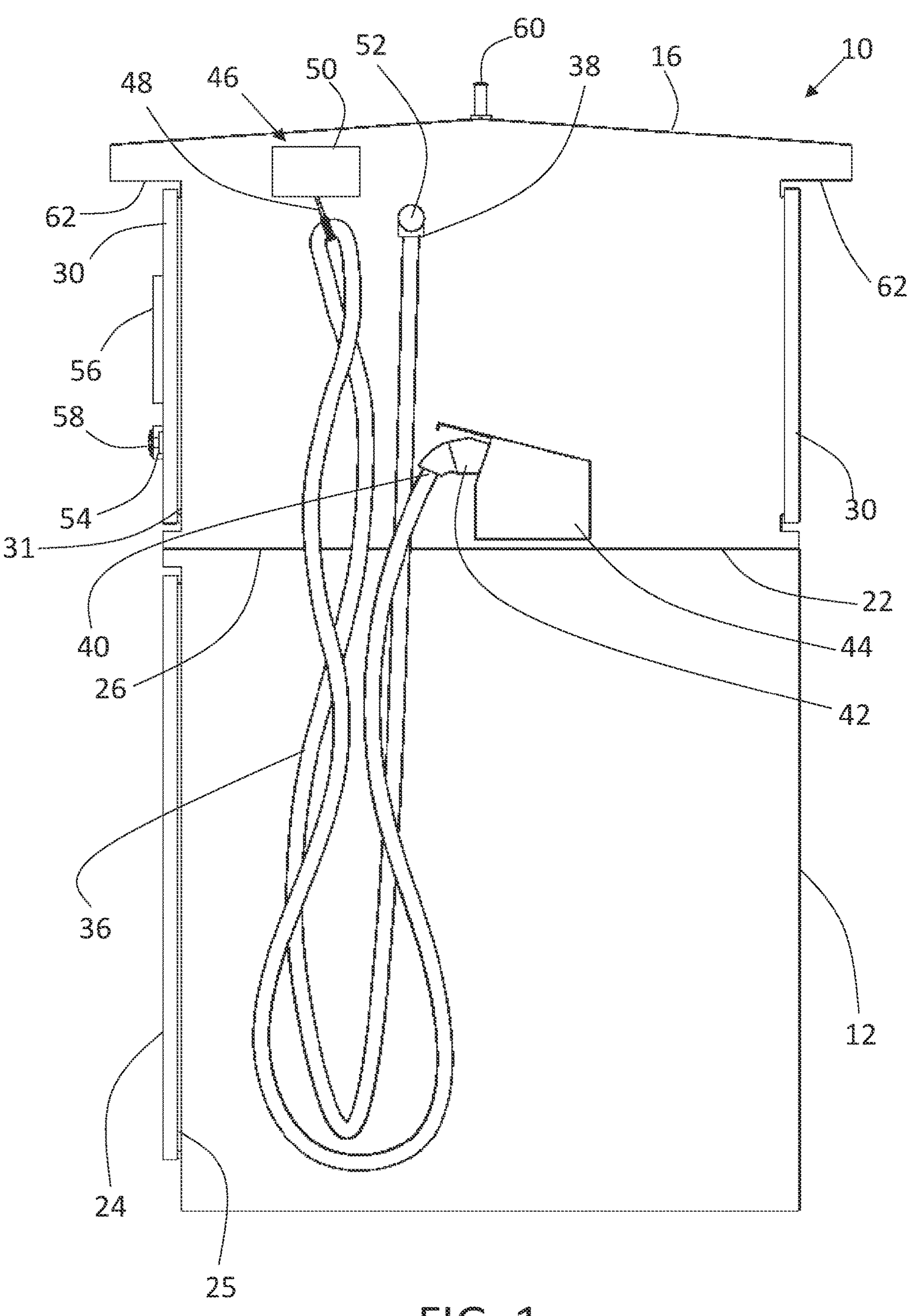
FIG. 1 is a side elevation view of a transformer and electric vehicle charger combination.

A transformer and electric vehicle charger combination, generally identified by reference numeral 10, will now be described with reference to FIG. 1 through FIG. 7.

Figure 2:
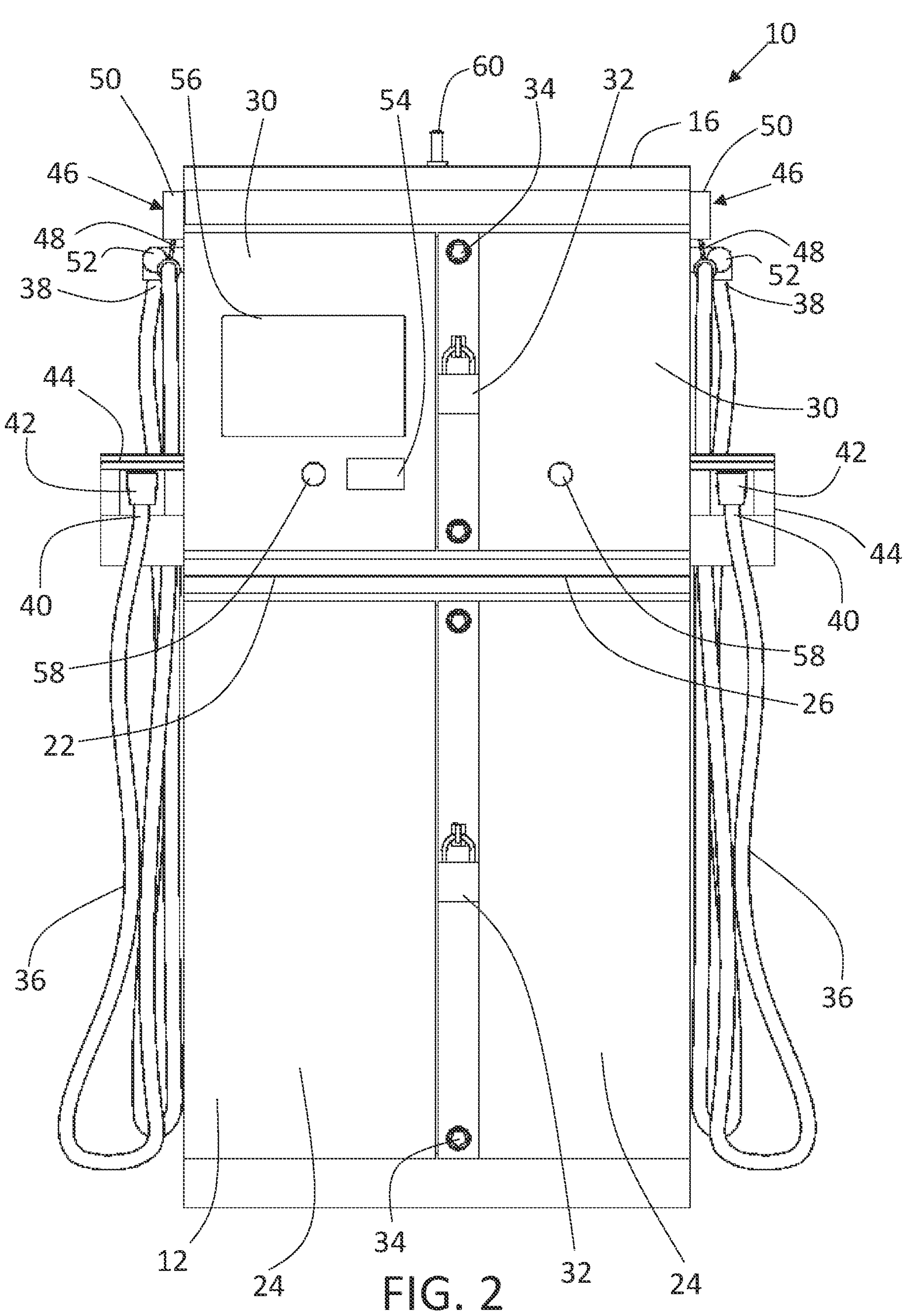
FIG. 2 is a front elevation view of the transformer and electric vehicle charger combination.
Figure 3:
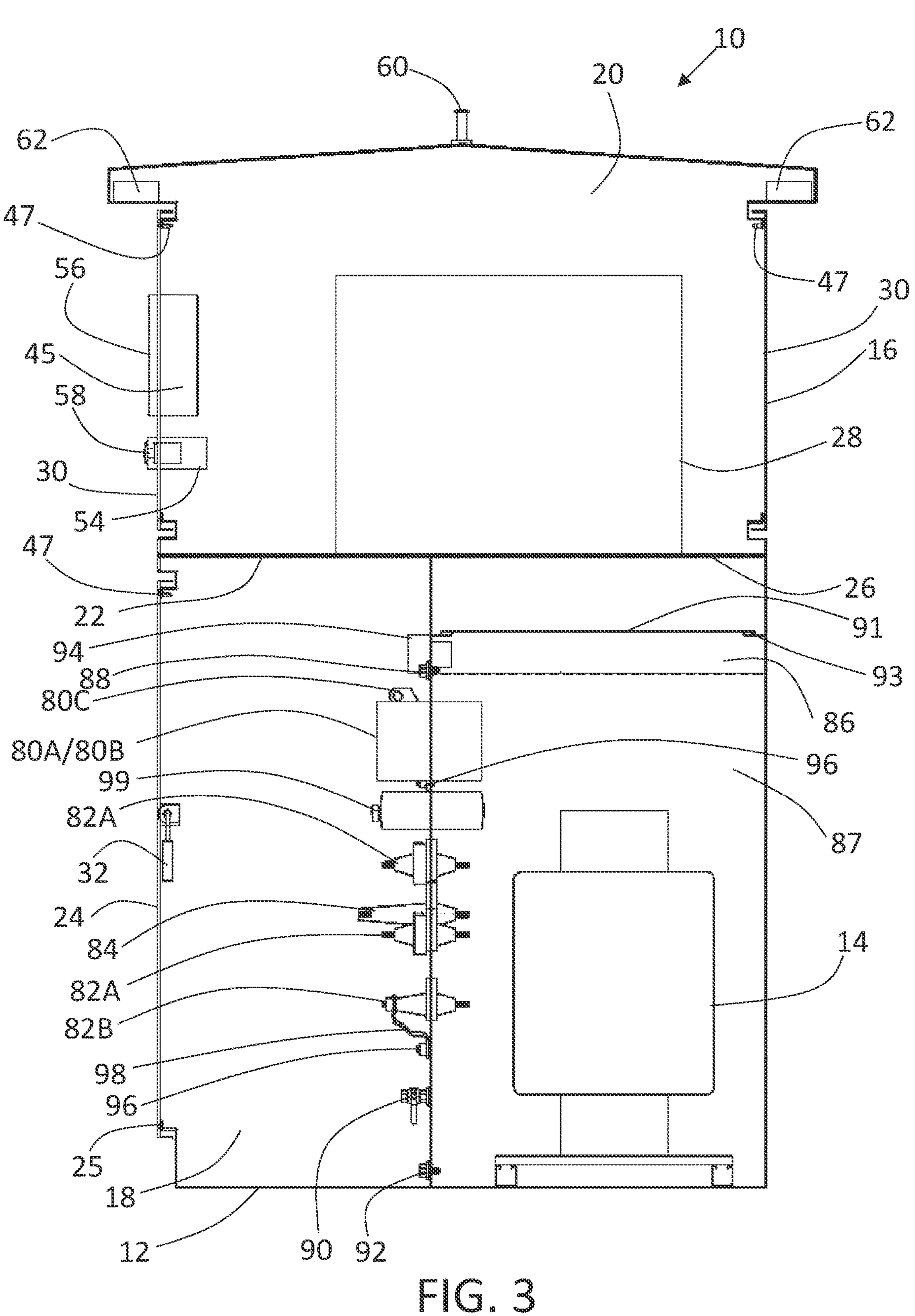
FIG. 3 is a side elevation view, partially in section, of the transformer and electric vehicle charger combination.

Referring to FIG. 3, a transformer and electric vehicle charger combination 10 is provided that has a charging box 16 and a transformer box 12. Referring to FIG. 1 and FIG. 2, charging box 16 is attachable to transformer box 12. In the embodiment shown, charging box 16 is positioned on a top 22 of transformer box 12. It will be understood by a person skilled in the art that charging box 16 may be attached in any other suitable location relative to transformer box 12. It is common for transformer box 12 to be positioned on a concrete pad, not shown. Transformer and electric vehicle charger combination 10 may be sized such that it fits on the same standard sized concrete pad as a typical transformer box. This allows existing transformer boxes to be replaced by transformer and electric vehicle charger combination 10 without increasing the amount of land used, doing earthwork, or adding underground infrastructure such as wiring or grounding. A gasket 26 may be positioned between transformer box 12 and charging box 16 to provide for sealing between them and help to prevent premature damage due to weathering and moisture ingress between transformer box 12 and charging box 16. Additional gaskets can be used to provide sealing assistance at any location where sealing would be beneficial. Charging box 16 and transformer box 12 may be replaced as separate devices to allow for repairs and upgrades as required.

Figure 4:
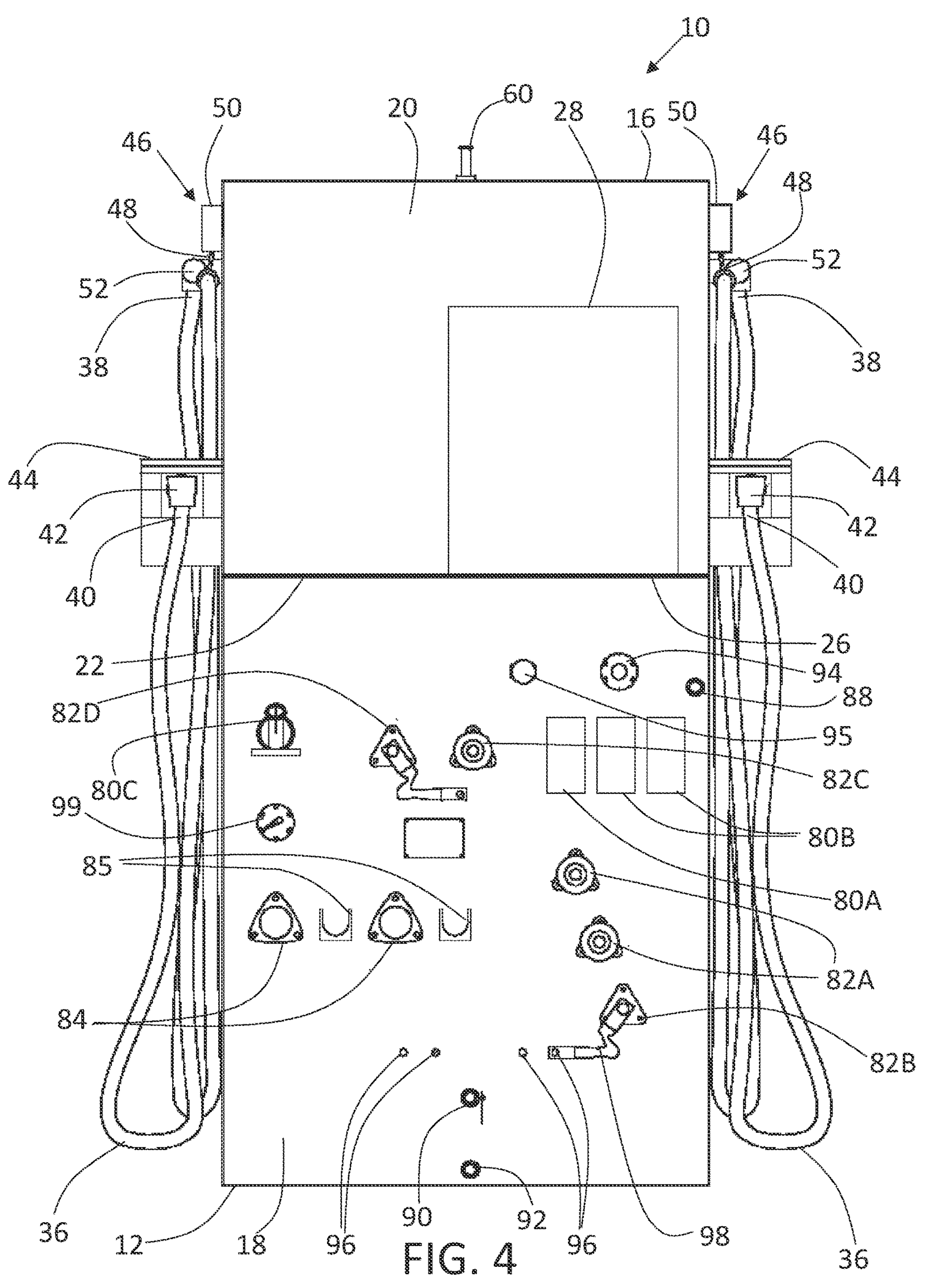
FIG. 4 is a front elevation view, partially in section, of the transformer and electric vehicle charger combination.

Referring to FIG. 3 and FIG. 4, transformer box 12 has a second hollow interior 18 that houses a transformer 14. In the embodiment shown, transformer 14 consists of copper or aluminum windings 71, 72 and 73 around an iron magnetic core. Transformer 14 has a dedicated copper or aluminum winding 73 to serve DC charger 28 and may have an additional winding 72 used for providing residential and business electricity. Winding 72 and 73 typically have different voltage and current ratings suitable to their supplied loads. Winding 71 receives medium voltage energy from the utility power supply. Transformer 14 may also be used for the sole purpose of providing charging for electric vehicles without winding 72. Second hollow interior 18 of transformer box 12 houses other elements known to a person skilled in the art. It will be understood by a person skilled in the art that different transformer boxes may have different elements, some of these elements, all of these elements or a combination of these elements in different orientations. These include, but are not limited to, primary medium voltage load or non load break elbow type electrical connections 84, elbow parking hooks 85, a cooling fluid tank 86 with gasket 91 and lid 93 which contains transformer oil 87 or other suitable heat transfer fluid, a fluid filling port 88, a fluid sample valve 90, a drain plug 92, a fluid pressure relief valve 94, a fluid temperature sensor 95, ground connections 96, windings 71, 72, and 73, a tap changer 99 and bonding cables 98, low voltage bushings with current transformers 82A and 82C, and low voltage bushings without current transformers 82B and 82D. While not shown, transformer 14 may also be an air cooled transformer instead of an oil or fluid cooled transformer and would, therefore, have appropriate elements known to persons skilled in the art.

Figure 5:
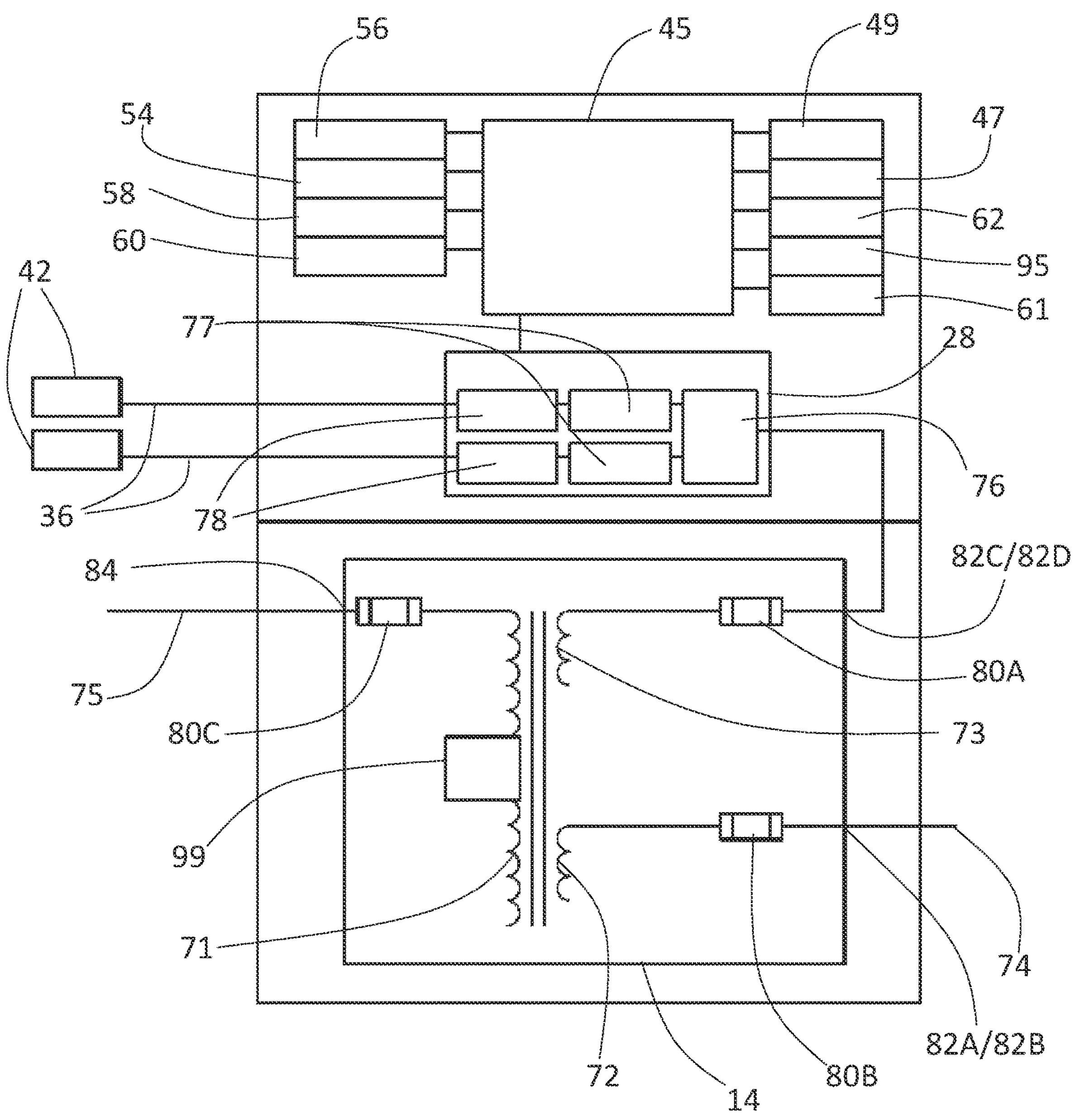
FIG. 5 is a schematic view of electrical connections within the transformer and electric vehicle charger combination.

Referring to FIG. 3 and FIG. 4, a DC charger 28 is positioned within a first hollow interior 20. Referring to FIG. 5, DC charger 14, consists of a high power rectifier 76, current control units 77 controlled by the central computer 45, and output contactors 78 to turn on and turn off the electrical connection to charge cords 36. Referring to FIG. 4 and FIG. 5, DC charger 28 is electrically connected to transformer 14 with copper conductors or busbar, not shown, such that electricity from transformer 14, specifically from winding 73 is transferred to DC charger 28. Bushings 82C and 82D are part of this electrical connection of winding 73 to charger 28, creating a mechanical seal to contain the oil or other cooling fluid 87 in tank 86 and allow the electricity to pass through the tank wall via the electrically insulated bushing. Referring to FIG. 1 and FIG. 2, to aid in maintenance, cleaning, and inspection, it is beneficial for charging box 16 to have access doors 30 that provide access to first hollow interior 20. In the embodiment shown, two access doors 30 are provided, however it will be understood by a person skilled in the art that a single access door or multiple access doors may be used. Referring to FIG. 1, charging box door gaskets 31 may be provided to seal against moisture ingress into first hollow interior 20 between access doors 30 and charging box 16. In the embodiment shown, transformer box 12 also has access doors 24 to allow access to second hollow interior 18 for maintenance, cleaning, and inspection. Transformer box door gaskets 25 may be provided to seal against moisture ingress into second hollow interior 18 between access doors 24 and transformer box 12. Access doors 24 and 30 may be locked to prevent access to first hollow interior 20 and second hollow interior 18. Limiting access to first hollow interior 20 and second hollow interior 18 helps to prevent damage to elements held within and prevent unauthorized access. Preventing access to first hollow interior 20 and second hollow interior 18 is also important for safety as improper manipulation of elements within can cause electrocution, serious injury and death. In the embodiments shown, access doors 24 and 30 are locked with padlocks 32, however it will be understood by a person skilled in the art that other locking mechanisms such as deadbolts, lock and key or any other suitable mechanism known to a person skilled in the art. Security bolts 34 may also be provided to prevent unwanted access to first hollow interior 20 and second hollow interior 18.

Figure 6:
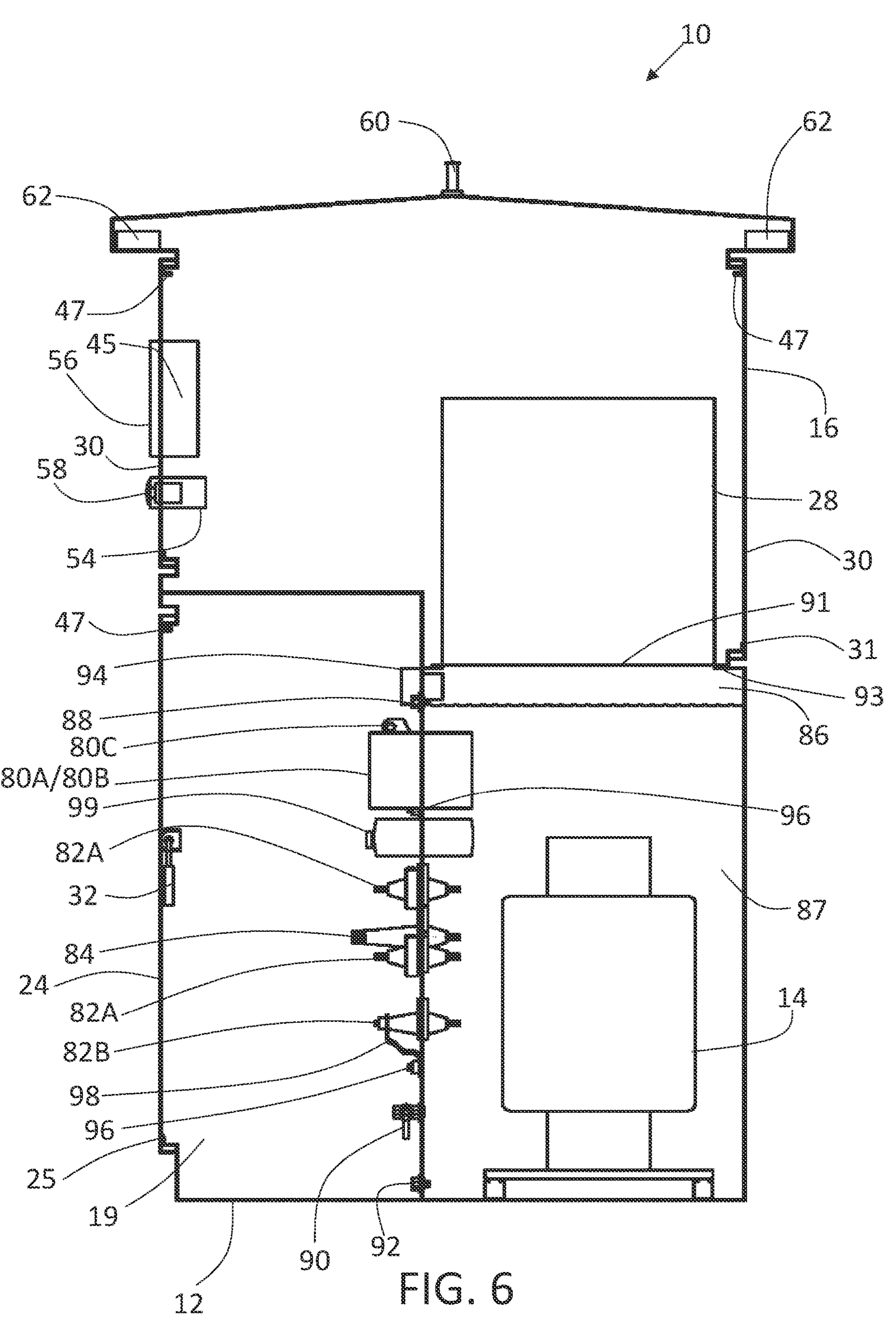
FIG. 6 is a side elevation view, partially in section, of the transformer and electric vehicle charger combination having an integrated hollow interior.
Figure 7:
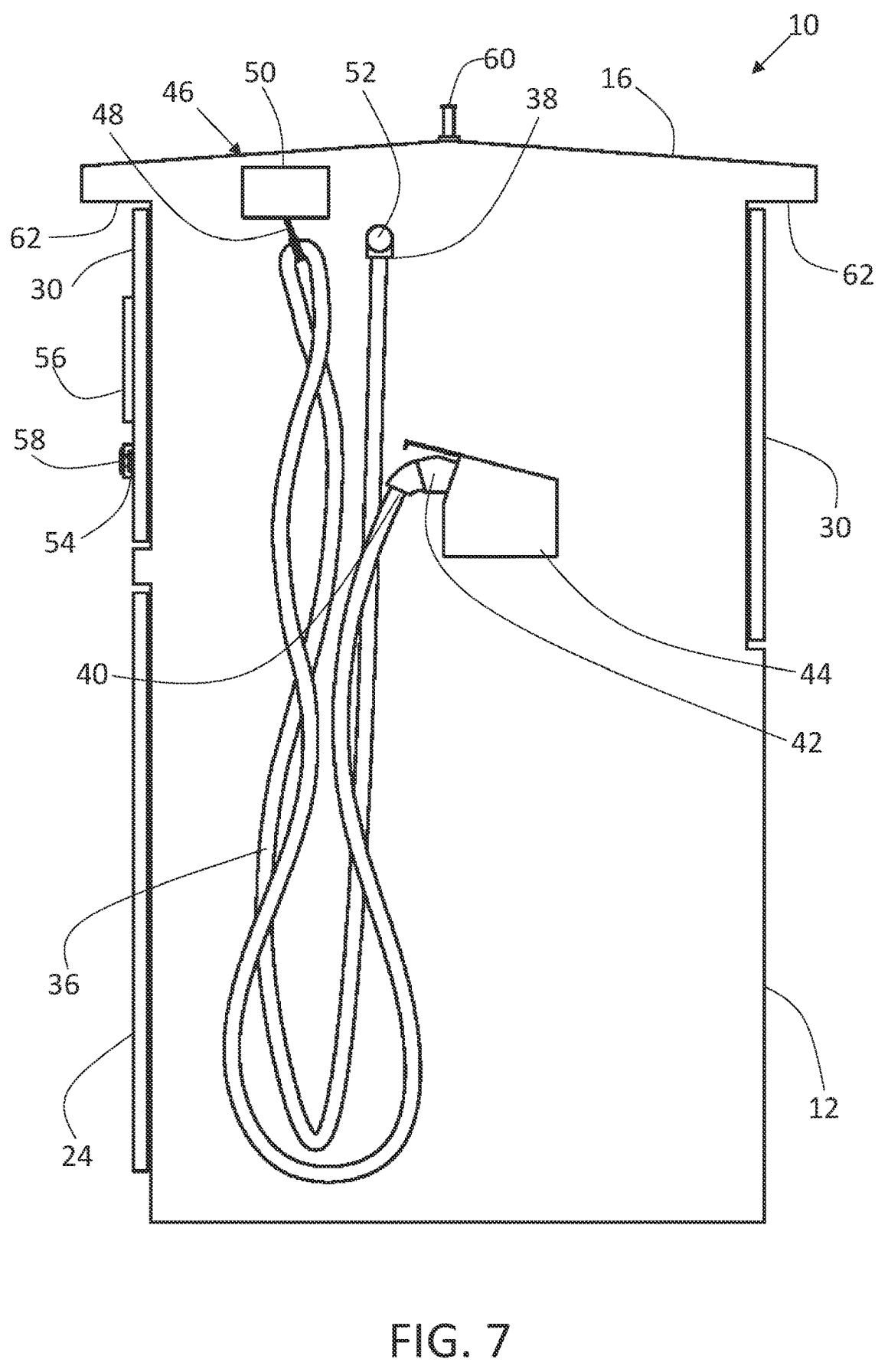

Referring to FIG. 6 and FIG. 7, charging box 16 and transformer box 12 may be integrally formed such that first hollow interior 20 and second hollow interior 18 form a single integrated hollow interior 19.

Referring to FIG. 1, FIG. 2, and FIG. 7, charging cords 36 are provided to supply electricity from DC charger 28 to an electric vehicle. In the embodiments shown, two charging cords 36 are shown. It will be understood by a person skilled in the art that a single charging cord or multiple charging cords may be used depending upon the availability of electricity and parking at any given transformer box 12. Charging cords 36 have a first end 38 and a second end 40. First end 38 is in electrical communication with DC charger 28 and second end 40 has an electric connector 42 for plugging into an electric vehicle charging port, not shown. Different brands of electric vehicles can have different types of charging ports, it will be understood by a person skilled in the art that electric connector 42 may be interchangeable to allow it to be used with different types of charging ports. Generally, a specific type of electric connector 42 would be selected by a vendor, however it is possible that an interchangeable connection could be provided that would allow users to attach their own electric connector 42 suitable for their electric vehicle. While not required, an electric connector holder 44 may be provided to hold electric connector 42 when electric connector 42 is not plugged into an electric vehicle. Electric connector holder 44 is positioned on charging box 16. Electric connector holder 44 may also be positioned on transformer box 12. Referring to FIG. 1, a locking mechanism, not shown, may be provided to prevent unauthorized users from accessing electric connector 42. This can help to improve cleanliness and help to maintain their fitness for use by authorized users. It is possible that users who fail to hang up electric connector 42 or charging cords 36 could be tracked and abuses could be monitored.

Referring to FIG. 5, a central computer 45 is provided that controls the flow of electricity from transformer 14 to DC charger 28 and to charging cords 36. Central computer 45 controls the flow of electricity and information within, to, and from transformer and electric vehicle charger combination 10.

Damage to charging cords 36 can occur in a number of different ways. Aside from normal wear through use, damage can occur when charging cords 36 are walked on, pulled, dropped, or driven over. To help prevent this damage, a retractable holding mechanism 46 can be employed. In the embodiment shown, retractable holding mechanism 46 has a cable 48 that is retractable into retraction unit 50. Cable 48 is attached to charging cords 36 in such a manner that charging cords 36 are held up off of the ground. When charging cords 36 are in use, cable 48 is pulled out from retraction unit 50 to provide slack to allow used to plug in electric connector 42. When charging cords 36 are not in use, cable 48 is retracted back into retraction unit 50 to hold charging cords 36 off the ground. To help prevent damage, charging cords 36 may have a breakaway fitting 52 to allow charging cord 36 to break away from charging box 16 at a predetermined force threshold. Breakaway fitting 52 may be provided in communication with central computer 45 such that the breaking of breakaway fitting 52 causes the flow of electricity from DC charger 28 to charging cord 36 to immediately cease. The affected portion of transformer and electric vehicle charger 10 would be put into an out of order mode preventing charging. Central computer 45 may alert an owner to the damage.

In the embodiment shown in FIG. 3, tamper switches 47 are added to each access door 24 and 30. Referring to FIG. 5, tamper switches 47 communicate with central computer 45 to send an alert to an owner or manager of transformer and electric vehicle charging combination 10. The alert is an indication that charging box 16 and/or transformer box 12 are not secure. An audible alert may also be sent in an attempt to scare off unauthorized users or troublemakers. Video recording may also be used to monitor for malicious activity. Central computer 45 may control cameras 49 and other monitoring devices. Other types of monitors including tilt switches, moisture detection and any other device known to a person skilled in the art may also be used and installed on transformer and electric vehicle charger combination 10.

Referring to FIG. 5, when the intention is to charge for use of electricity, a method of taking payment is required. A payment authorization system is provided in communication with central computer 45. Referring to FIG. 2, payment authorization system includes a payment reader 54 is provided to take payment from users. Costs associated with utilizing the electricity can be determined by the installers or owners of transformer and electric vehicle charger combination 10. Referring to FIG. 5, in the embodiment shown, payment reader 54 is operated by central computer 45 with information and options available on a screen 56. Central computer 45 controls circuits of DC charger 28. When an authorized payment is made and electric connector 42 is correctly attached to a charging port of an electric vehicle, central computer 45 allows a DC current to pass from DC charger 28 to electric connector 42. To improve safety, removal of electric connector 42 from charging port of the electric vehicle may result in immediate discontinuation of electricity flow from DC charger 28. When no authorized payment is made, central computer 45 prevents DC current from passing from DC charger 28 to electric connector 42. Referring to FIG. 2, screen 56 is preferably positioned on an exterior of charging box 16. Screen 56 can provide information about electric output transfer rates, billing rates, membership point credits, advertisements, estimated time remaining to charge, news, weather conditions, payment information, purchase options, and any other information considered useful to a user or owner known to a person skilled in the art.

Referring to FIG. 4, in the embodiment shown, transformer 14 is a single phase three winding 71, 73 and 73 transformer. In the embodiment shown, transformer 14 has two electrical terminal bushings 82C and 82D that provide dedicated output for DC charger 28 and three bushings 82A and 82B to supply residential or business customers. It will be understood by a person skilled in the art that three phase utility supply may optionally be used. While not shown, a person of skill in the art would understand that transformer and electric vehicle charger combination 10 may require up to four bushings. Overcurrent protection for output of winding 73 and 72 from transformer 14 may require additional fuses 80B and 80C. It will be understood by a person skilled in the art that a single or three phase transformer can be used in the transformer and electric vehicle charger combination 10. It is understood by a person skilled in the art that transformer 14 windings 71, 72 and 73 voltages and current ratings may change depending on electrical utility availability 75, end customer 74 needs, and DC charger 28 requirements. Transformer 14, through winding 72, can provide dedicated output for supplying electricity for an additional use such as residential utilities. Overcurrent protection for outputs for supplying electricity for an additional use is provided by overcurrent fuses 80B that protect the transformer 14 and winding 72 from existing residential or business customers who could accidentally apply overload or fault the transformer. It will be understood by a person skilled in the art that a single electrical terminal bushing 82B or multiple electrical terminal bushings 82B may be used and the number may change depending on customer needs and utility electrical availability. Referring to FIG. 5, all electrical energy to transformer and electric vehicle charger combination 10 is supplied by a single utility feeder connection 75. By providing dedicated outputs for DC charger 28 and dedicated outputs for supplying electricity for an additional use, individual metering using high accuracy current measuring devices may be used. In the embodiment shown in FIG. 5, bushing 82C and 82 D provides dedicated output for DC charger 28 and bushing 82A and 82B provides dedicated output for residential and commercial use. Each has an overcurrent fuse 80A and 80B, respectively. An additional overcurrent fuse 80C is provided on utility feeder connection 75 to protect the utility connection from transformer 14 failure or short circuit.

Referring to FIG. 3, in the event of an emergency or malfunction, it may be important to cut power flowing from DC charger 28 to charging cords 36. Emergency stop 58 cuts power to DC charger 28 when emergency stop 58 is activated. Referring to FIG. 5, central computer 45 controls the flow of electricity through the DC charger current control 77 and contactor 78 and electric vehicle charger combination 10 and may stop the flow of electricity coming from DC charger 28 when emergency stop 58 is activated. In the embodiment shown, DC charger 28 has internal overcurrent and overheat protection, transformer temperature monitoring, and is further protected by an overcurrent fuse protection provided by fuse 80A. A gross malfunction of DC charger 28 will burn out or blow a fuse 80A. It will be understood by a person skilled in the art that emergency stop 58 may work in different ways. In the embodiment shown, two emergency stops 58 are provided, one for each of charging cords 36. It will be understood by a person skilled in the art that a single emergency stop 58 may be provided and multiple emergency stops 58 add convenience and closer proximity in the event of an emergency.

A cellular, radio, Wi-Fi, or other communication antenna 60 may be provided on charging box 16 to assist with real-time transaction verification and authorization, communication of status to the electric vehicle regarding charging status and allow for updates to any internal software related to payment reader 54, screen 56 or any other software used in association central computer 45.

Referring to FIG. 3 and FIG. 4, first hollow interior 20 may heat up due to the conversion of AC to DC charging current when electricity is converted by DC charger 28 from AC to DC. To manage heat, vents 62 may be provided to allow heat to escape from first hollow interior 20. Vents 62 may have fans to assist with air flow and thermostats that control when fans operate. Fluid temperature sensor 95 may be enhanced and may be interfaced to DC charger 28 and payment authorization system through central computer 45 to maximize delivered power to electric vehicle customers based on ambient temperature, transformer temperature and transformer prior loading. Another option to manage heat would be to share a liquid cooling system between transformer box 12 and charging box 16. Adding pipes for heat exchange to allow oil or other heat transfer fluid to travel from cooling fluid tank 86 through both transformer box 12 and charging box 16 is one method of achieving heat management. Referring to FIG. 5, in particularly cold climates, a heater 61 may be useful to prevent freezing of transformer and electric vehicle charger combination components.

There are a number of potential benefits associated with transformer and electric vehicle charger combination 10. Transformer and electric vehicle charger combination 10 is designed to fit and connect to existing electrical utility pads. These are generally precast concrete pads with existing utility medium and low voltage wiring and earth grounding. By fitting on an existing electrical utility pad, transformer and electric vehicle charger combination 10 can be installed without increasing the ground footprint over a previous transformer. It is also a cost effective way of adding electric vehicle charging infrastructure into neighborhoods without significant overhaul of facilities or significant additions. Using a charging box retrofit can allow for reduced time and cost associated with the installation of charging stations. Additional benefits include reducing greenhouse gas emissions by supporting electric vehicles, increasing availability to electric vehicle charging close to places where people live, and sharing the available electric power that may already be available in a neighborhood effectively. Other benefits may include reducing the cost to individual home owners required to retrofit homes with slow overnight chargers, prevent increased electrical loading on secondary low voltage conductors between homes and pad mount transformers necessary to install home chargers, support DC fast charging close to residential homes where it is convenient, support DC fast charging for travelers passing through who may otherwise experience long lines at a limited number of available charging locations, providing competition to electric vehicle charging supplies and reducing costs to consumers through competition, allowing guests of residents to fast charge their vehicles for return trips home, and allowing charging for residents without garages or who live in homes without dedicated parking. A further potential benefit is that thermal sharing of transformer capacity occurs, allowing minimum materials to provide maximum power to the electricity users. Homes and businesses get what they need, and electric vehicles receive everything that is left available from the system. This allows for maximum transferred energy in minimum time for waiting motorists.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A transformer and electric vehicle charger combination, comprising:

a charging box having a first hollow interior, a DC charger being positioned within the first hollow interior;

a transformer box having a second hollow interior, the transformer box having a high voltage utility connection, the charging box being attachable to the transformer box such that the charging box and the transformer box are positioned together in a single location, an electrical transformer being positioned within the second hollow interior, the electrical transformer having at least one dedicated winding to serve the DC charger and at least one additional winding for supplying electricity for other purposes, the DC charger being electrically connected to the dedicated winding of the transformer such that electricity from the transformer is supplied to the DC charger;

at least one charging cord having a first end and a second end, the first end being in electrical communication with the DC charger and the second end having an electric connector for plugging into an electric vehicle charging port; and a central computer, the central computer controlling the flow of electricity from the electrical transformer to the DC charger and to the at least one charging cord such that when authorized the central computer allows a current to pass from the DC charger to the electric connector and when not authorized the central computer prevents the current from passing from the DC charger to the electric connector.

2. The transformer and electric vehicle charger combination of claim 1 wherein the charging box has at least one access door to provide access to the first hollow interior.

3. The transformer and electric vehicle charger combination of claim 1 wherein the transformer box has at least one access door to provide access to the second hollow interior.

4. The transformer and electric vehicle charger combination of claim 1 wherein a gasket is positioned between the charging box and the transformer box to provide sealing against moisture ingress between the charging box and the transformer box.

5. The transformer and electric vehicle charger combination of claim 2 wherein a charging box door gasket is positioned on the at least one access door to provide sealing against moisture ingress into the first hollow interior between the at least one access door and the charging box.

6. The transformer and electric vehicle charger combination of claim 3 wherein a transformer box door gasket is positioned on the at least one access door to provide sealing against moisture ingress into the second hollow interior between the at least one access door and the transformer box.

7. The transformer and electric vehicle charger combination of claim 1 wherein a payment authorization system is provided, the payment authorization system being connected to the central computer such that an authorized payment causes the central computer to allow a DC current to pass from the DC charger to the electric connector, the central computer preventing the DC current from passing from the DC charger to the electric connector when no authorized payment is made.

8. The transformer and electric vehicle charger combination of claim 7 wherein a screen is positioned on the enclosure, the screen providing information about at least one of output readings, payment information, purchase options, charge status, estimated finishing time, or electricity rates.

9. The transformer and electric vehicle charger combination of claim 1 wherein the at least one charging cord has a breakaway fitting to allow for breakaway of the charging cord at a predetermined force threshold.

10. The transformer and electric vehicle charger combination of claim 9 wherein breakaway of the charging cord at the predetermined force threshold causes shutdown of the flow of electricity from the DC charger.

11. The transformer and electric vehicle charger combination of claim 1 wherein an emergency stop is provided in communication with the central computer such that activation of the emergency stop terminates the transfer of electricity from the DC charger to the at least one charging cord.

12. The transformer and electric vehicle charger combination of claim 1 wherein the transformer has at least one dedicated output for the DC charger and at least one dedicated output for supplying electricity for an additional use, the at least one dedicated outputs for the DC charger and the at least one dedicated output for supplying electricity for an additional use having an overcurrent protection, and each of the dedicated outputs for the DC charger and the at least one dedicated output for supplying electricity for an additional use being supplied by a single utility feeder connection.

13. The transformer and electric vehicle charger combination of claim 1 wherein the charging box is positioned on a top of the transformer box.

14. The transformer and electric vehicle charger combination of claim 1 wherein the transformer box is positioned on a concrete pad mount.

15. The transformer and electric vehicle charger combination of claim 1 wherein the first hollow interior and the second hollow interior are integrally formed.

* * * * *